United States Patent [19]

Yamagata et al.

[11] Patent Number: 5,926,766
[45] Date of Patent: *Jul. 20, 1999

[54] CORDLESS TELEPHONE WITH DIVISION OF CHANNELS INTO GROUPS OF CHANNELS

[75] Inventors: Masato Yamagata, Kanagawa; Kazunori Nakajima, Saitama, both of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/559,468

[22] Filed: Nov. 15, 1995

[30] Foreign Application Priority Data

Nov. 22, 1994 [JP] Japan .................................... 6-312496

[51] Int. Cl.$^6$ ...................................................... H04Q 7/20
[52] U.S. Cl. ......................... 455/464; 455/426; 455/462
[58] Field of Search ................................. 379/58, 61, 62; 455/34.1, 34.2, 54.1, 426, 450–452, 455, 462, 463, 464, 509, 516

[56] References Cited

U.S. PATENT DOCUMENTS

| | | | |
|---|---|---|---|
| 5,044,010 | 8/1991 | Frenkiel et al. | 379/61 |
| 5,237,603 | 8/1993 | Yamagata et al. | 379/61 |
| 5,349,632 | 9/1994 | Nagashima | 455/462 |
| 5,375,163 | 12/1994 | Kamimoto et al. | 379/61 |
| 5,418,839 | 5/1995 | Knuth et al. | 379/61 |
| 5,627,883 | 5/1997 | Maeda et al. | 379/61 |
| 5,758,292 | 5/1998 | Iida | 455/550 |

*Primary Examiner*—Dwayne D. Bost
*Assistant Examiner*—Nay A. Maung
*Attorney, Agent, or Firm*—Jay H. Maioli

[57] ABSTRACT

In a cordless telephone having no control channel, the time required for connecting a cordless handset to a base unit is reduced in a cordless telephone wherein a cordless handset and a base unit are connected using any one of a plurality of communication channels to allow a call, the plurality of communication channels are divided into a plurality of groups. By using a communication channel included in one of the plurality of groups, standby, calling, and call receiving modes of operation are effected.

8 Claims, 6 Drawing Sheets

| CHANNEL NO. | FIRST GROUP | SECOND GROUP |
|---|---|---|
| 1 | ○ | |
| 2 | | ○ |
| 3 | ○ *1 | |
| 4 | | ○ *1 |
| 5 | ○ | |
| 6 | | ○ |
| 7 | ○ | |
| 8 | | ○ |
| 9 | ○ | |
| 10 | | ○ |
| 11 | ○ | |
| 12 | | ○ |
| 13 | ○ | |
| 14 | | ○ |
| 15 | ○ | |
| 16 | ○ *2 | ○ *2 |
| 17 | ○ | |
| 18 | | ○ |
| 19 | ○ | ○ |
| 20 | | ○ |
| 21 | ○ | |
| 22 | | ○ |
| 23 | ○ | ○ |
| 24 | ○ | ○ |
| 25 | ○ | ○ |

○ : CHANNEL ASSIGNED TO THE GROUP
*1 : CHANNEL TENTATIVELY SET AS LAST CHANNEL WHEN POWER IS TURNED ON.
*2 : INITIAL CHANNEL

| CHANNEL NO. | FIRST GROUP | SECOND GROUP |
|---|---|---|
| 1 | O | |
| 2 | | O |
| 3 | O *1 | |
| 4 | | O *1 |
| 5 | O | O |
| 6 | | O |
| 7 | O | |
| 8 | | O |
| 9 | O | |
| 10 | | O |
| 11 | O | |
| 12 | | O |
| 13 | O | |
| 14 | | O |
| 15 | O | |
| 16 | O *2 | O *2 |
| 17 | O | |
| 18 | | O |
| 19 | O | O |
| 20 | | O |
| 21 | O | |
| 22 | | O |
| 23 | O | O |
| 24 | O | O |
| 25 | O | O |

FIG.2B

| i | DIVIDING RATIO Ni | |
|---|---|---|
| | FIRST GROUP | SECOND GROUP |
| 0 | N01 | N02 |
| 1 | N03 | N04 |
| 2 | N05 | N06 |
| 3 | N07 | N08 |
| 4 | N09 | N10 |
| 5 | N11 | N12 |
| 6 | N13 | N14 |
| 7 | N15 | N16 |
| 8 | N16 | N18 |
| 9 | N17 | N19 |
| 10 | N19 | N20 |
| 11 | N21 | N22 |
| 12 | N23 | N23 |
| 13 | N24 | N24 |
| 14 | N25 | N25 |

CHTBL

O : CHANNEL ASSIGNED TO THE GROUP
*1 : CHANNEL TENTATIVELY SET AS LAST CHANNEL WHEN POWER IS TURNED ON.
*2 : INITIAL CHANNEL

CORDLESS TELEPHONE WITH DIVISION OF CHANNELS INTO GROUPS OF CHANNELS

BACKGROUND OF THE INVENTION

1. Field of the Invention

The present invention relates to a multichannel access type cordless telephone.

2. Description of the Related Art

Two control channels and 87 communication channels are available for low power type cordless telephones in Japan. When a call is placed or received, a control channel is first used to connect the base unit and cordless handset and, thereafter, communication can be started using a communication channel.

In the case of cordless telephones in the United States, no control channel is available and only a plurality of control channels are prepared like very low power type systems in Japan.

The FCC (Federal Communications Commission) in the United States first approved five channels for cordless telephones and another five channels were added later to total the approved channels at ten. Since the number of communication channels has become insufficient as a result of the widespread use of cordless telephones, it is expected that another fifteen channels will be added to provide twenty five channels in total.

In a cordless telephone for which no control channel is available as described above, the base unit and cordless handset are required to always monitor the communication channels in the standby mode so as to be able to respond to a connection request from each other (cordless handset or base unit) any time.

Increasing the number of communication channels to twenty five as mentioned above, however, will require considerable time for all of such communication channels to be monitored.

Switching of a communication channel to another is generally carried out by changing the dividing ratio of a variable frequency division circuit in a PLL (phase locked loop). Therefore, in the case of a microcomputer for system control, it takes about 25 ms for the PLL to be stabilized after the data of the new dividing ratio after a channel change is generated and loaded into the variable frequency division circuit of the PLL. Further, it takes about 35 ms before the presence or absence of an electric wave from the base unit or cordless handset is detected in any communication channel.

Therefore, it takes 1.5 s ((25 ms+35 ms)×25 channels) to make a round of the entire communication channels. That is, such a long period of time is required for monitoring all of the communication channels only once.

As a result, it takes an undesirably long time for a cordless handset before inputs on the dial keys thereof are accepted after the call key is pushed when a call is placed to a public switched telephone network.

In addition, if a cordless handset always monitors the communication channels, the power consumption of the rechargeable battery which feeds the cordless handset will be accelerated. This shortens the operable period of the cordless handset supported by one charging operation.

Taking the above-described situation into consideration, a method has been proposed wherein a scan mode for sequentially monitoring all the communication channel once and a sleep mode (a mode wherein the power supplies of all circuits except the microcomputer are turned off for a predetermined period of time) are alternately enabled. This method makes it possible to suppress the consumption of the battery because even the microcomputer consumes almost no current in the sleep mode.

In this case, however, such an effect is reduced unless the period of the sleep mode is sufficiently longer than that of the scan mode. If the number of the communication channels is as large as twenty five as described above, it takes a considerably long time to complete one cycle of the combined scan and sleep modes. This is impractical because it takes a considerably long time before a request for reception of a call from the base unit is accepted by the cordless handset.

It is an object of the present invention to solve the above-described problems.

SUMMARY OF THE INVENTION

According to the present invention, in a cordless telephone wherein a cordless handset 1 and a base unit 2 are connected for communication using any one of a plurality of communication channels, the above-described object is achieved by dividing the plurality of communication channels into a plurality of groups of channels and by enabling standby, calling, and call reception using a communication channel included in one of the plurality of groups thus divided.

Since usable channels are divided into a plurality of groups, the apparent number of channels associated with the connection between the cordless handset 1 and base unit 2 is reduced. This shortens the time required for the connection.

DETAILED DESCRIPTION OF THE PREFERRED EMBODIMENT

Figure 1:
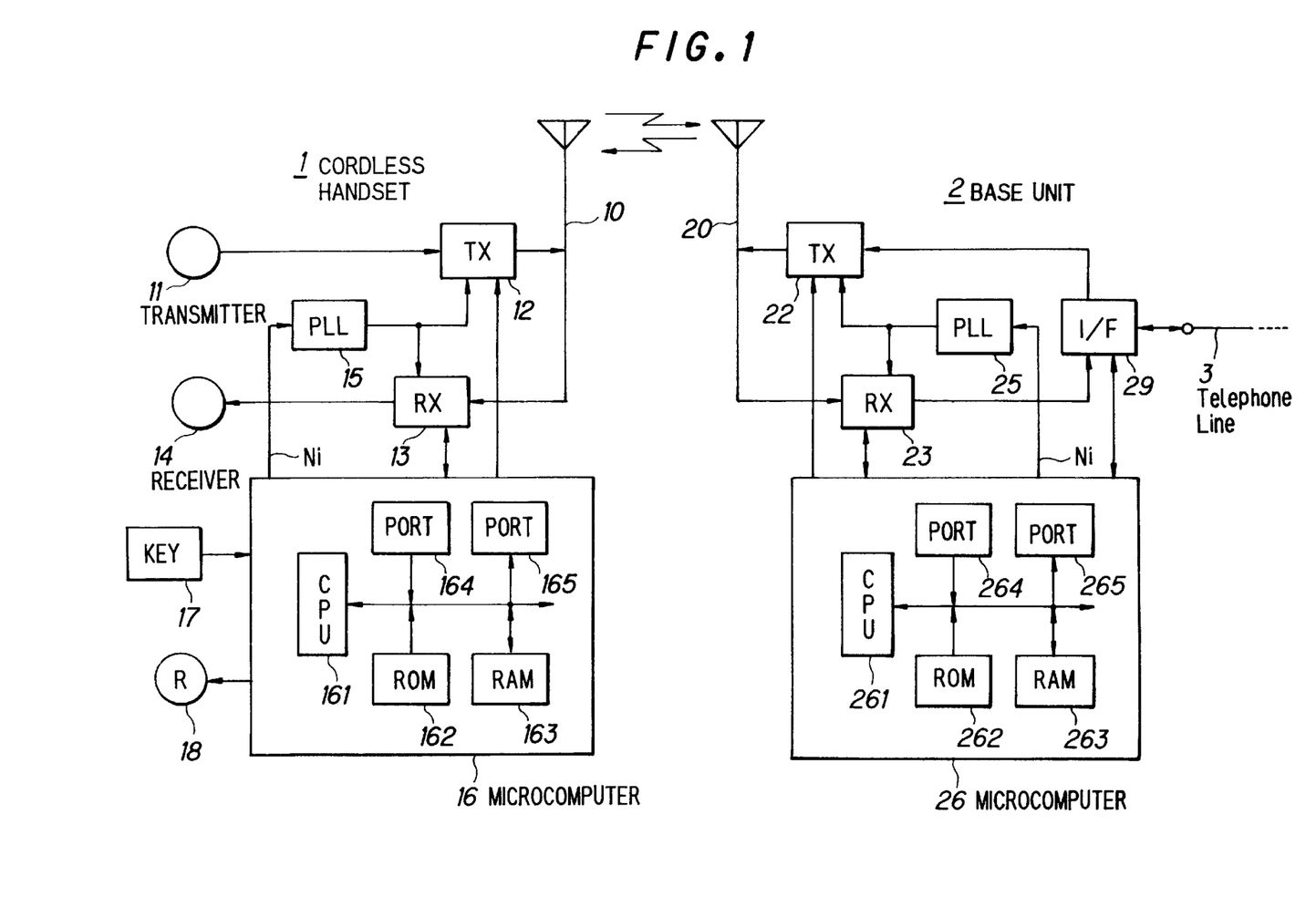
FIG. 1 is a system diagram showing an embodiment of the present invention.

In FIG. 1, a cordless handset 1 of a cordless telephone is connected to a base unit 2 via a radio channel which unit is connected to a telephone line 3. In the cordless handset 1, a transmitter 11 is connected to a transmission circuit 12 for transmitting audio signals and various data, and a reception circuit 13 for receiving incoming audio signals and various data is connected to a receiver 14.

The output signal (oscillation signal) of a PLL 15 is supplied to the transmission circuit 12 and reception circuit 13 as a carrier signal for frequency conversion. Therefore, a change in the dividing ratio N of a variable frequency division circuit in the PLL 15 results in a change in the frequency of the output signal of the PLL 15. It is therefore possible to change the transmission frequency of the transmission circuit 12 and the reception frequency of the reception circuit 13, i.e., the communication channel, in accordance with the dividing ratio N.

Reference numeral 16 designates a microcomputer for controlling the system. Reference numeral 17 designates various operation keys. Reference numeral 18 designates a ringer for notifying an incoming call and the like. In this case, the microcomputer 16 includes a CPU 161 which performs processing on a four-bit basis, a ROM 162 in which various programs are written, a RAM 163 which serves as a work area and which stores data, an input port 164, an output port 165, etc.

The programs written in the ROM 162 include, for example, process routines 300, 400, 500, and 600 as shown in FIGS. 3 through 6. The ROM 162 also contains, for example, a channel table CHTBL as shown in FIG. 2B.

Twenty five communication channels are available in the United States. Let those channels be referred to as 1st through 25th channels in the order of their frequencies. The 16th through 25th channels are the currently available communication channels and the 1st through 15th channels are communication channels which will be added in future.

These 25 channels are divided into two groups, i.e., the first and second groups, and some channels are allowed to belong to both groups.

Figure 2A:
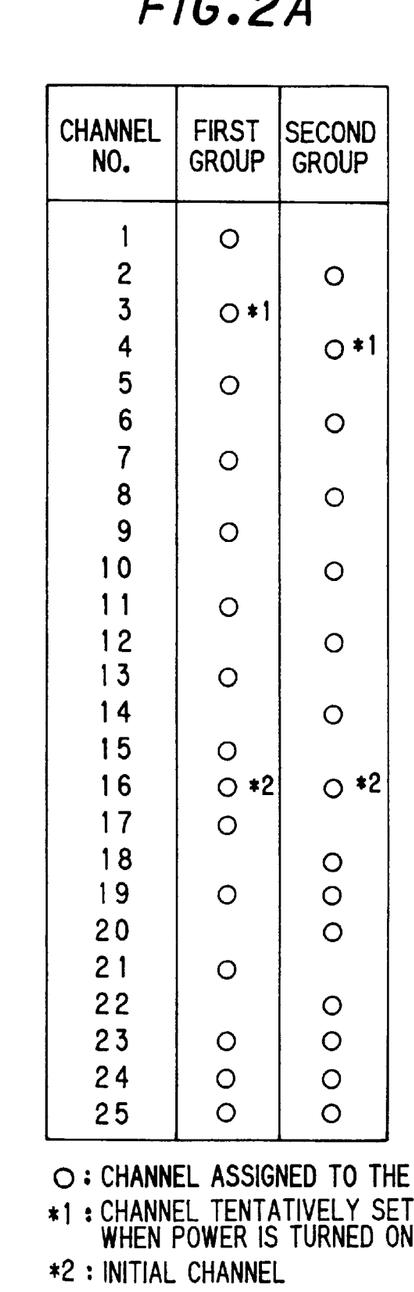
FIG. 2A and FIG. 2B show an example of a data table according to the present invention.
Figure 2B:
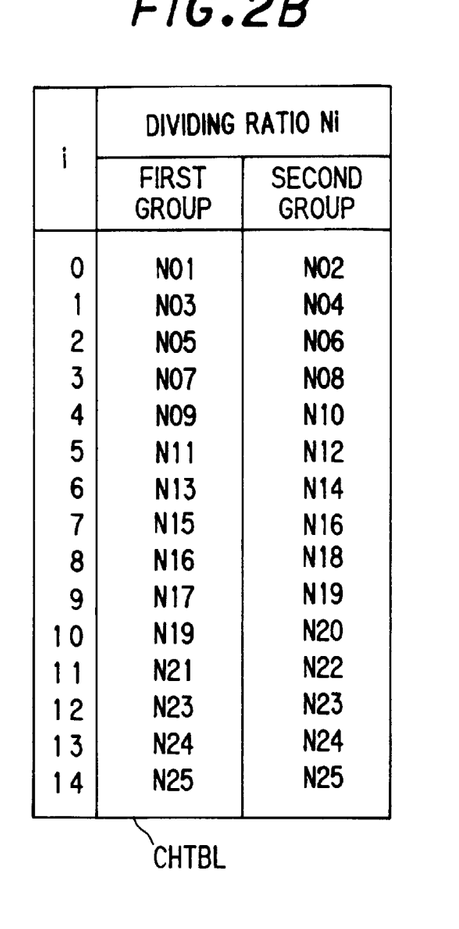

In this embodiment, as indicated by the circles in FIG. 2A, channels having odd channel numbers and the 16th and 24th channels are made to belong to the first group, and channels having even channel numbers and the 19th, 23rd, and 25th channels are made to belong to the second group. Therefore, the 16th, 19th, and 23rd through 25th channels are allowed to belong to both of the first and second groups.

As shown in FIG. 2B, the channel table CHTBL has rows for fifteen sets of data as indicated by i being from 0 to 14. Each row shows the data of the frequency of the communication channels that belong to each group.

The table CHTBL in FIG. 2B shows a case wherein the dividing ratios Ni of the variable frequency division circuit of the PLL 15 are provided as such frequency data. Specifically, dividing ratios N01, N03, . . . , N25 for the odd-numbered communication channels, a dividing ratio N16 for the 16th channel, and a dividing ratio N24 for the 24th channel are provided in the order of the frequencies as frequency data for the first group, and dividing ratios N02, N04, . . . , N24 for the even-numbered communication channels, a dividing ratio N19 for the 19th channel, a dividing ratio N23 for the 23rd channel, and a dividing ratio N25 for the 25th channel are provided in the order of the frequencies as the frequency data for the second group.

One of the channels belonging to each of the first and second groups which does not belong to the other group, e.g., the third and fourth channels as indicated by *1 in FIG. 2A in this embodiment, serves as a tentative last channel for the actual last channel (the channel used for the most recent call) when data indicating the last channel has been destroyed due to the replacement of the battery or the like.

Further, one of the communication channels belonging to both of the first and second groups, i.e., one of the 16th, 19th, and 23rd through 25th channels (e.g. the 16th channel) is referred to as the initial channel and is always monitored by the cordless handset 1 in the standby mode. The initial channel varies, for example, depending on the type of cordless telephone used to be dispersed among the series of communication channels that can be chosen as the initial channel.

The ROM 162 contains an identification code which allows the cordless handset 1 to be distinguished from other handsets. When a signal such as data is received from the base unit 2, it is checked whether the signal includes an identification code and, if yes, whether the identification code agrees with the identification code written in the ROM 162. Thus, only a signal or data destined for the handset 1 is validated.

The RAM 163 stores data GRPNUM indicating which group on the table CHTBL is used. If the dividing ratio of the last channel is the dividing ratio shown in the row in the ILAST-th place (ILAST=any of 0 through 14) on the table CHTBL, this value ILAST is also stored.

Various items of data are accessed by the transmission circuit 12 and the reception circuit 13 through the ports 164 and 165, and the operation of the transmission circuit 12 and the reception circuit 13 is set or controlled by the data. Moreover, as more specifically described later, one dividing ratio Ni is picked up from among the dividing ratios N01 through N25 prepared on the channel table CHTBL and is set in the variable frequency division circuit in the PLL 15 through the port 165. Then, the channel corresponding to the set dividing ratio Ni is set as the communication channel to be used.

The base unit 2 has substantially the same configuration as that of the cordless handset 1. Specifically, it includes a transmission circuit 22 for transmitting audio signals and data, a reception circuit 23 for receiving audio signals and data, a PLL 25, a microcomputer 26 for controlling the system, and a telephone line interface circuit 29.

In this case, the PLL 25 operates similarly to the PLL 15 of the cordless handset 1. Like the microcomputer 16 of the cordless handset 1, the microcomputer 26 includes a CPU 261 which performs processing on a four-bit basis, a ROM 262 in which various programs are written, a RAM 263 which serves as a work area and which stores data, an input port 264, an output port 265, etc.

The programs written in the ROM 262 include process routines 350, 450, 550, and 650 as shown in FIGS. 3 through 6. The ROM 262 also contains the channel table CHTBL and identification code as described above. The RAM 263 stores data GRPNUM indicating the group and the data ILAST indicating the last channel.

The interface circuit 29 has a four-wire/two-wire convention circuit, a switching circuit for releasing and acquiring the telephone line 3, a detection circuit for detecting ringer signal issued when a call is received, etc. and is connected to the microcomputer 26.

This cordless telephone operates as follows in accordance with processes performed by the microcomputers 16 and 26.

Call Using the Cordless Handset 1

During a call using the cordless handset 1 with a party on the other end of the telephone line, an audio signal from the transmitter 11 is supplied to the transmission circuit 12 to be converted into an FM signal for the outgoing communication channel, and the FM signal is transmitted from an antenna 10 to the base unit 2.

At the base unit 2, the FM signal transmitted by the cordless handset 1 is received by an antenna 20 and is supplied to the reception circuit 23. The audio signal from the cordless handset 1 is picked up at the reception circuit 23 and is transmitted to the telephone line 3 through the interface circuit 29.

An audio signal from the party on the other end of the line is supplied through the interface circuit 29 to the transmission circuit 22 to be converted into an FM signal for the incoming communication channel, and this FM signal is transmitted from the antenna 20 to the cordless handset 1. At the cordless handset 1, the FM signal transmitted by the base unit 2 is received by the antenna 10 and is supplied to the reception circuit 13. The audio signal from the party is picked up at the reception circuit 13 and is supplied to the receiver 14. Thus, a call can be made with the party on the other end of the line using the cordless handset 1.

Operation in the Standby Mode

Figure 4:
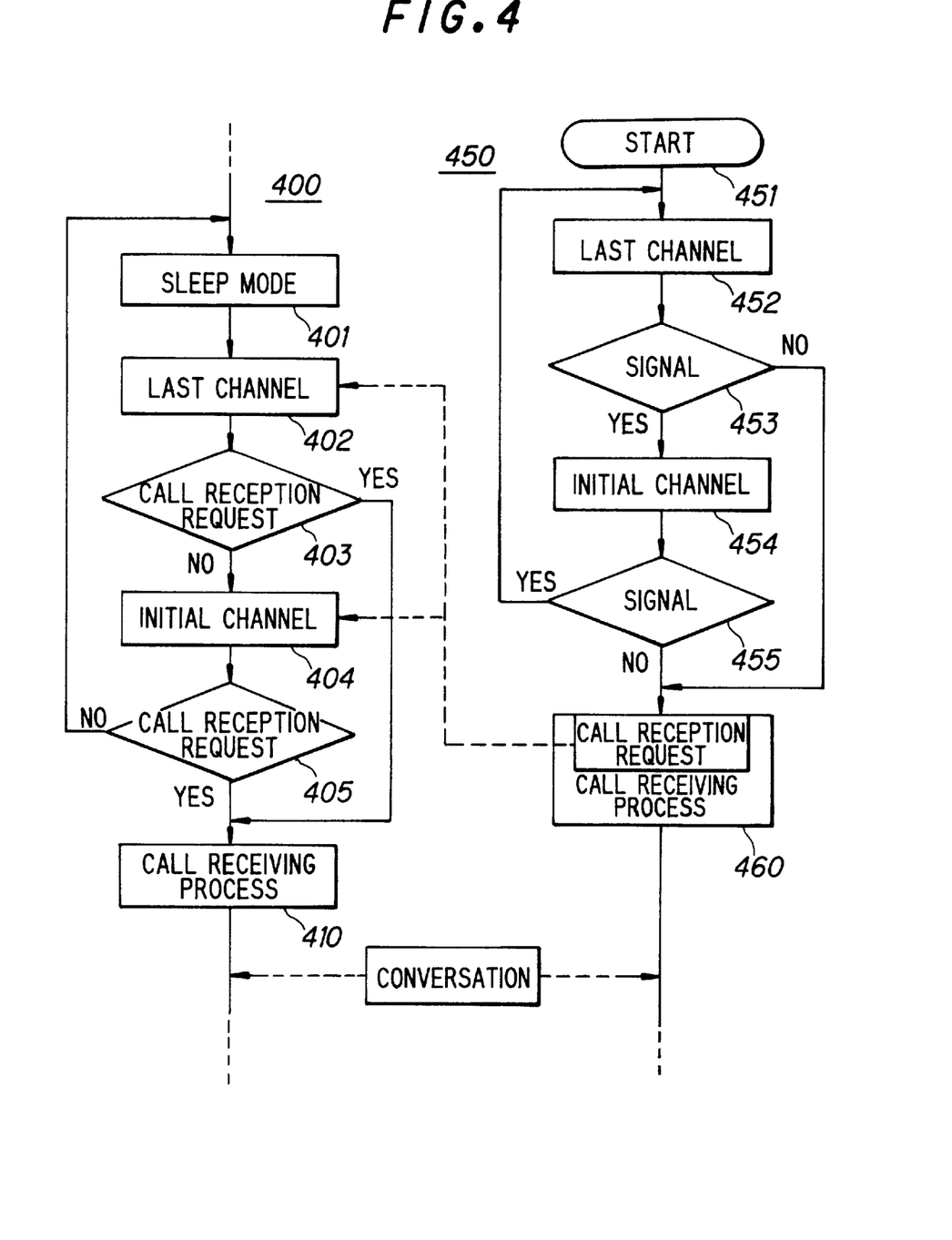
FIG. 4 is a flow chart showing an example of a process routine according to the present invention performed when a call is received.

In the standby mode, the CPU 261 repeats the processes at steps 351 through 353 of the routine 350. Specifically, a variable i is incremented by one at step 351. When the variable i is incremented to be i=15, it returns to i=0.

Next, at step 352, the dividing ratio i in the i-th row of the group indicated by the data GRPNUM stored in the RAM 263 is read from the channel table CHTBL and is set in the variable frequency division circuit of the PLL 25. As a result, the channel determined by the dividing ratio Ni will serve as the communication channel when the PLL 25 is stabilized.

Next, it is checked at step 353 whether a call request from the cordless handset 1 can be received over the channel set at step 352. In this case, the data of the call request from the cordless handset 1 to the base unit 2 is accompanied by an identification code that identifies the cordless handset 1, and this identification code is also checked. When it is determined that a call request from the cordless handset 1 can not be received, the process returns from step 353 to step 351.

Thus, the base unit 2 repeats the processes at steps 351 through 353 in the standby mode. Further, in the standby mode, the 15 channels belonging to the group indicated by the data GRPNM stored in the RAM 263 on the channel table CHTBL are repeatedly sequentially monitored.

Meanwhile, in the cordless handset 1, the CPU 161 repeats the processes at steps 401 through 405 of the routine 400. Specifically, at step 401, the power supply is turned off for all circuits except the microcomputer 16, and the microcomputer itself enters a sleep mode (power down mode). This suppresses the consumption of the battery (not shown) serving as the power supply.

For example, the microcomputer 16 returns to the normal mode after two seconds in this sleep mode and, at the same time, the power supply for the reception circuit 12 etc. is turned on. Then, the process in the CPU 161 proceeds to step 402. At step 402, the data GRPNUM and ILAST are read from the RAM 163, and the table CHTBL is referred to in accordance with the data GRPNUM and ILAST to read the dividing ratio $N_{ILAST}$ of the last channel which is then set in the variable frequency division circuit of the PLL 15. The last channel is set as the communication channel.

The process then proceeds to step 403 at which it is checked whether a request for call reception from the base unit 2 is being received over the last channel set at the step 402, with an identification code accompanying the request being checked as well. If there is no request for call reception, the process proceeds from step 403 to step 404 at which the dividing ratio of the initial channel, i.e., a dividing ratio N16 in this embodiment, is set in the variable frequency division circuit of the PLL 15. Thus, the initial channel is set as the communication channel.

Next, it is checked at step 405 whether a request for call reception from the base unit 2 is being received over the initial channel set at the step 404, with an identification code accompanying the request being checked as well. If there is no request for call reception, the process returns from step 405 to step 401.

As described above, until the cordless handset 1 is called up by the base unit 2 using the last or initial channel, it is in a standby state wherein it repeats the processes at steps 401 through 405. In other words, the cordless handset 1 is on standby in the last or initial channel. In the standby state, the sleep mode is entered at step 401 to suppress the consumption of the battery.

Outgoing Call from the Cordless Handset 1 to Telephone Line

Figure 3:
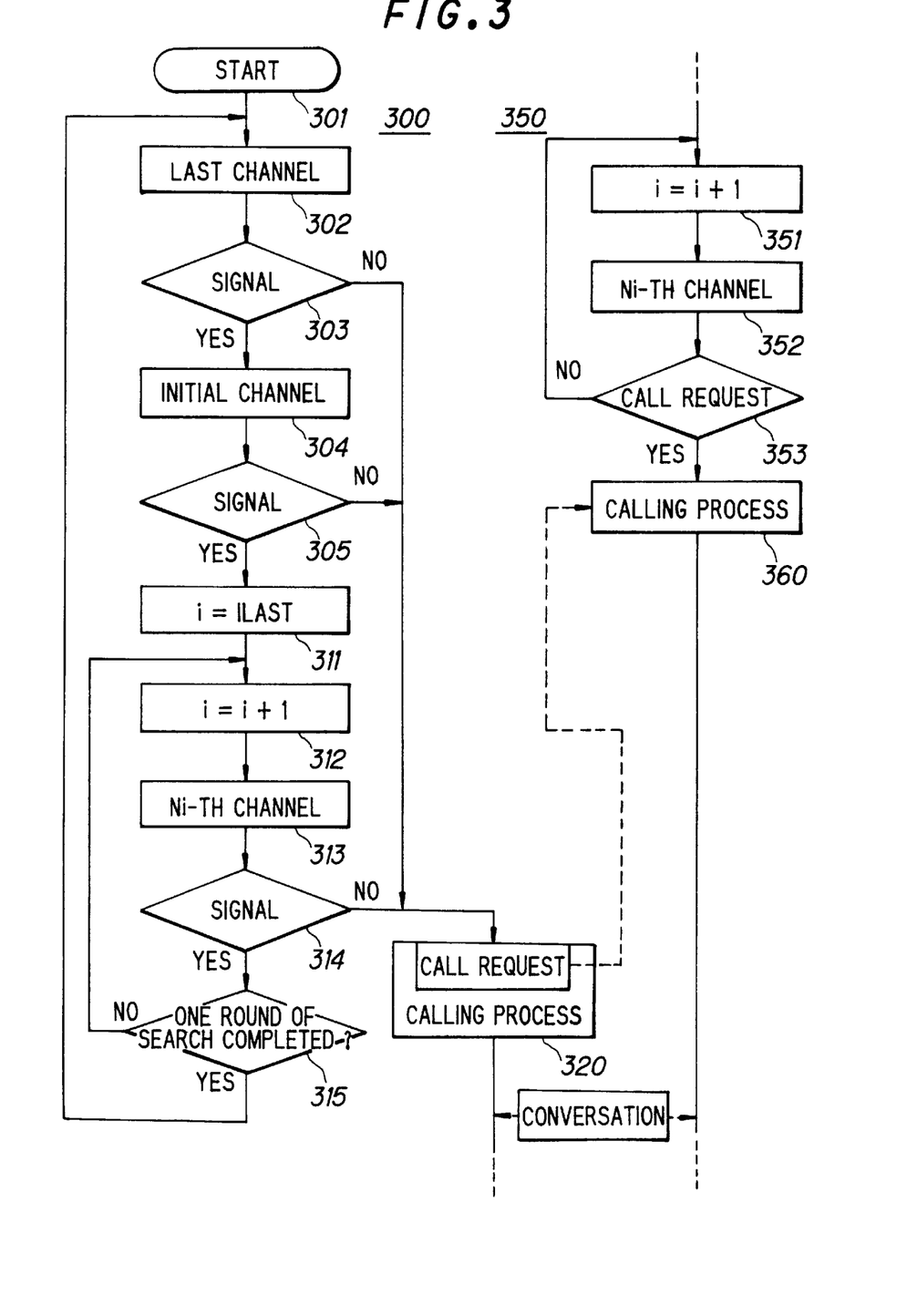
FIG. 3 is a flow chart showing an example of a process routine according to the present invention performed when a call is placed.

This mode of operation is enabled as a result of the execution of the routine 300 by the microcomputer 16 of the cordless handset 1 and the execution of the routine 350 by the microcomputer 26 of the base unit 2.

Specifically, a push on a call key among the operation keys 17 on the cordless handset 1 with the cordless handset 1 and base unit 2 in the standby state causes interruption, for example. The CPU 161 executes the routine 300 starting from step 301. At step 302, the data GRPNUM and ILAST are read from the RAM 163, and the table CHTBL is referred to in accordance with the data GRPNUM and ILAST to read the dividing ratio $N_{ILAST}$ of the last channel which is in turn set in the variable frequency division circuit of the PLL 15. Thus, the last channel is set as the communication channel.

The process then proceeds to step 303 at which it is checked whether a carrier signal can be received over the last channel set at step 302. In other words, it is checked whether the last channel is being used by another cordless telephone. If not, the process proceeds from step 303 to step 320.

The process at step 320 is the same as a calling process in a common cordless telephone. Specifically, transmission from the transmission circuit 12 is permitted to transmit the data for a call request to the base unit 2. Then, a predetermined protocol is executed between the cordless handset 1 and base unit 2 to connect them using the channel over which the call request has been made, i.e., the last channel in this case.

If it is determined at step 303 that the last channel is in use, the process proceeds from step 303 to step 304 at which the dividing ratio N16 of the initial channel is set in the variable frequency division circuit of the PLL 15. Thus, the initial channel is set as the communication channel.

The process then proceeds to step 305 at which it is checked whether a carrier signal can be received over the initial channel set at step 304, whereby it is checked whether the initial channel is being used by another cordless telephone. If not, the process proceeds from step 305 to step 320.

Thereafter, a connection process for placing a call is performed using the initial channel at step 320 as described above.

Further, if it is determined at step 305 that the initial channel is in use, the process proceeds from step 305 to step 311 at which the variable i is set to the value ILAST stored in the RAM 163. Next, the variable i is incremented by 1 at step 312. In this case, when the variable i is incremented to be i=15, it returns to i=0.

The process then proceeds from step 312 to step 313 at which the dividing ratio Ni in the i-th row of the group indicated by the data GRPNUM on the table CHTBL is read, and the dividing ratio Ni is set in the variable frequency division circuit of the PLL 15. Thus, the channel corresponding to the dividing ratio Ni is set as the communication channel.

Next, it is checked at step 314 whether a carrier signal can be received over the channel set at step 313, whereby it is checked whether the channel is being used by another cordless telephone. If yes, the process proceeds from step 314 to step 315 at which it is checked whether one round of search has been completed from i=0 to i=14 on the table CHTBL to find an unused channel.

If one round of such channel search has not been completed, the process returns from step 315 to step 312 and, thereafter, steps 312 through 315 are repeated.

When an unused channel is found during the repetition, the process proceeds from step 314 to step 320 at which a connection process for placing a call is performed as described above using the unoccupied channel.

If the search makes one round of all channel without finding an unoccupied channel, th process returns from step 315 to step 302.

As described above, when a call is placed from the cordless handset 1, a call request is sent to the base unit 2 using the last or initial channel. If the last and initial channels are being used by another cordless telephone, 15 channels belonging to the stored group on the table CHTBL are sequentially checked and, if there is any unoccupied channel, the call request is sent using the channel.

Meanwhile, the base unit 2 repeats steps 351 through 353 in the standby mode as described above to cyclically monitor the 15 channels belonging to the group indicated by the data GRPNUM stored in the RAM 263 on the table CHTBL.

Therefore, when an FM signal requesting a call is transmitted by the cordless handset 1 at step 320, the FM signal is detected at step 353. Then, the process proceeds from step 353 to step 360.

The process at step 360 is the same as a calling process in a common cordless telephone. Specifically, transmission from the transmission circuit 22 is permitted, and the data for a response to the call request is transmitted to the cordless handset 1. Then, a predetermined protocol is executed between the base unit 2 and the cordless handset 1 to connect them using the channel over which the call request has been made.

Thereafter, if the telephone number of the party to be called is input using the dial keys among the operation keys 17 on the cordless handset 1, the data of the telephone number is sent to the base unit 2 over the channel which has been connected as described above. The base unit 2 sends the dial signal to the telephone line 3. Then, if the party responds, a call can be made to the party as described above.

Receiving a Call from the Telephone Line

This mode of operation is enabled as a result of the execution of the routine 400 by the microcomputer 16 and the execution of the routine 450 by the microcomputer 26.

Specifically, when there is an incoming call from the telephone lines with the cordless handset 1 and base unit 2 in the standby mode, the base unit 2 detects the call from a ringer signal thereof. The output of such detection causes, for example, interruption which in turn causes the CPU 261 to execute the routine 450 starting from step 451.

Next, at step 452, the data GRPNUM and ILAST are read from the RAM 263. The dividing ratio $N_{ILAST}$ of the last channel is read by referring to the table CHTBL according to the data GRPNUM and ILAST and is set in the variable frequency division circuit of the PLL 25. Thus, the last channel is set as the communication channel.

The process then proceeds to step 453 at which it is checked whether a carrier signal can be received over the last channel set at step 452. In other words, it is checked whether the last channel is being used by another cordless telephone. If not, the process proceeds from step 453 to step 460.

The process at step 460 is the same as a call reception process in a common cordless telephone. Specifically, transmission from the transmission circuit 22 is permitted, and the data for a call reception request is transmitted to the cordless handset 1. Then, a predetermined protocol is executed between the cordless handset 1 and the base unit 2 to connect them using the channel over which the call reception request has been made, i.e., the last channel in this case.

If it is determined at step 453 that the last channel is in use, the process proceeds from step 453 to step 454 at which the dividing ratio N16 of the initial channel is set in the variable frequency division circuit of the PLL 25. Thus, the initial channel is set as the communication channel.

The process then proceeds to step 455 at which it is checked whether a carrier signal can be received over the initial channel set at step 454. It is therefore checked whether the initial channel is being used by another cordless telephone. If not, the process proceeds from step 455 to step 460.

Thereafter, a connection process for receiving a call is performed using the initial channel at step 460 as described above.

Further, if it is determined at step 455 that the initial channel is in use, the process returns from step 455 to step 452.

As described above, when there is an incoming call from the telephone line, a request for call reception is sent to the cordless handset 1 using the last channel or the initial channel.

Meanwhile, the cordless handset 1 repeats steps 401 through 405 in the standby mode as described above to monitor the last channel and the initial channel alternately.

When an FM signal requesting call reception is transmitted by the base unit 2 at step 460, the FM signal is detected at step 403 or 405, and the process proceeds from step 403 or 405 to step 410.

The process at step 410 is the same as a call reception process in a common cordless telephone. Specifically, transmission from the transmission circuit 12 is permitted, and the data for a response to the call reception request is transmitted to the base unit 2. Then, a predetermined protocol is executed between the cordless handset 1 and the base unit 2 to connect them using the channel over which the call reception request has been made.

Then, the ringer 18 of the cordless handset 1 rings to notify of the incoming call. When the call key among the operation keys 17 on the cordless handset 1 is pushed to receive the incoming call, the ringer 18 stops and the base unit 2 is notified of the push on the call key. This allows a call with the party as described above.

Channel Switching

Figure 5:
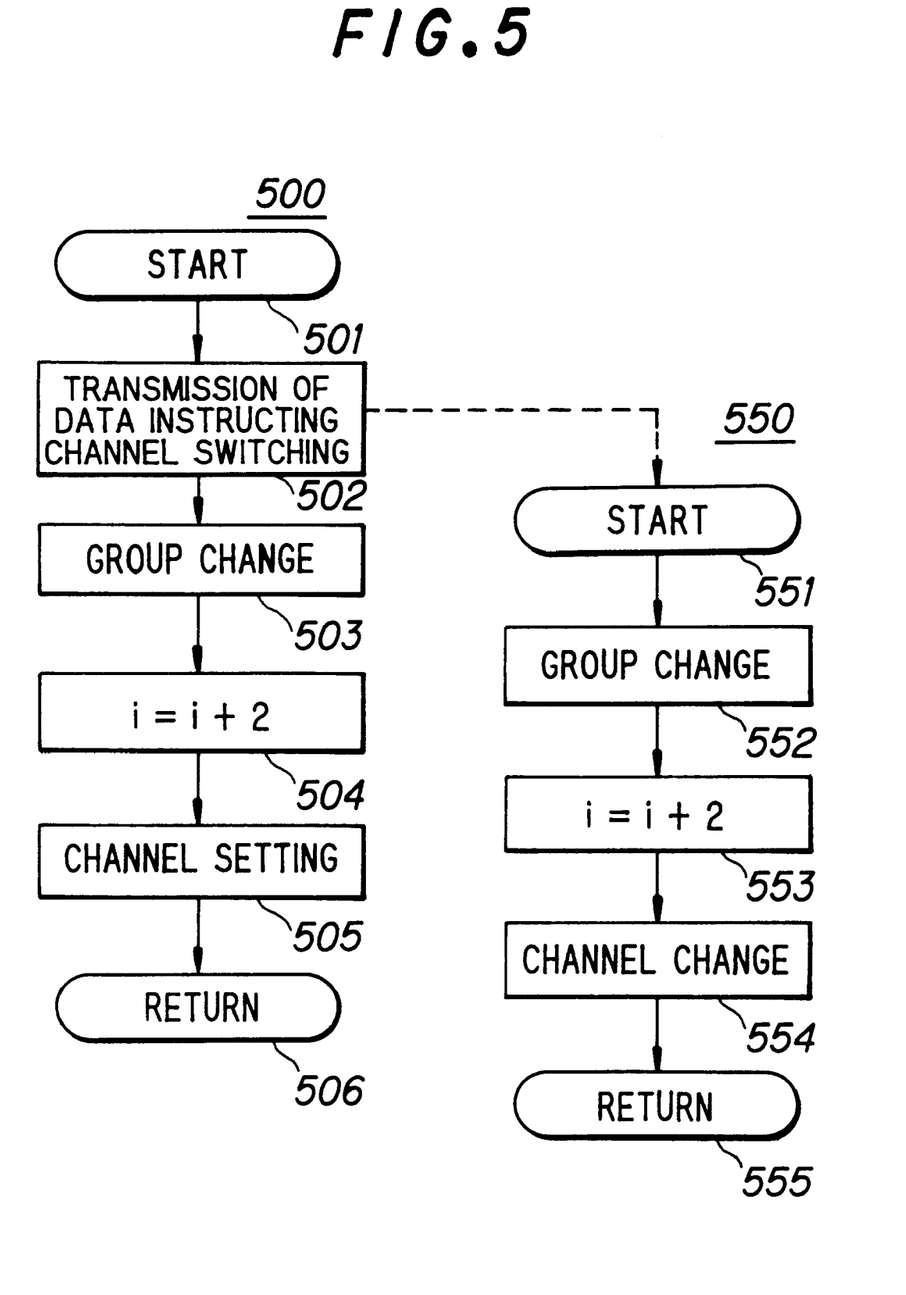
FIG. 5 is a flow chart showing an example of a process routine according to the present invention performed when a channel is switched to another.

This operation is to change the channel currently used for a call to another for reasons including crosstalk with another cordless telephone in the vicinity during a call with a party on the telephone line using the cordless handset 1.

In this case, a channel switch key among the operation keys 17 is pushed during the call. For example, this causes interruption and the CPU 161 executes the routine 500 starting from step 501. At step 502, data instructing channel switching is generated, supplied to the transmission circuit 12, and transmitted to the base unit 2 over the channel currently used for the call.

The process then proceeds to step 503 at which switching is performed to select the second group if a channel in the first group has been used and to select the first group if a channel in the second group has been used. Thus, the currently used group is switched to the other group.

Next, the process proceeds to step 504 at which the variable i is incremented by two. If the variable i equals to or exceeds 15 as a result of the incrementation, 15 is subtracted from the value.

Then, the process proceeds to step 505 at which the dividing ratio Ni in the i-th row of the group selected at step 503 is read from the table CHTBL and is set in the variable frequency division circuit of the PLL 15. At this point, the communication channel for the cordless handset 1 is changed to another channel belonging to the other group.

The process then proceeds to step 506 to terminate this routine 500.

In base unit 2, at step 502, the data for channel switching transmitted by the cordless handset 1 is taken out from the reception circuit 23 and is supplied to the microcomputer 26. The supply of this data initiates the routing 550 starting from step 551. At step 552, switching between the groups on the table CHTBL is performed as in step 503.

Next, the process proceeds to step 553 at which the variable i is incremented by two as in step 504. In this case, if the variable i equals or exceeds 15 as a result of the incrementation, 15 is also subtracted from the value.

At this point, therefore, the channel group and variable i on the table CHTBL for the base unit 2 agree with the channel group and variable i for the cordless handset 1 immediately after the execution of step 504.

The process then proceeds to step 554 at which, like at step 505, the dividing ratio Ni in the i-th row of the group selected at step 552 is read from the table CHTBL and is set in the variable frequency division circuit of the PLL 25. At this point, therefore, the communication channel of the base unit 2 is switched to the communication channel of the cordless handset 1 selected at step 505.

Thereafter, the process proceeds to step 555 to terminate this routine 550.

As described above, in the case of crosstalk or interference to a channel, a push on the channel switch key among the operation keys 17 causes switching of the group and channel on the channel table CHTBL to allow communication free from crosstalk and the like.

Termination of a Call

Figure 6:
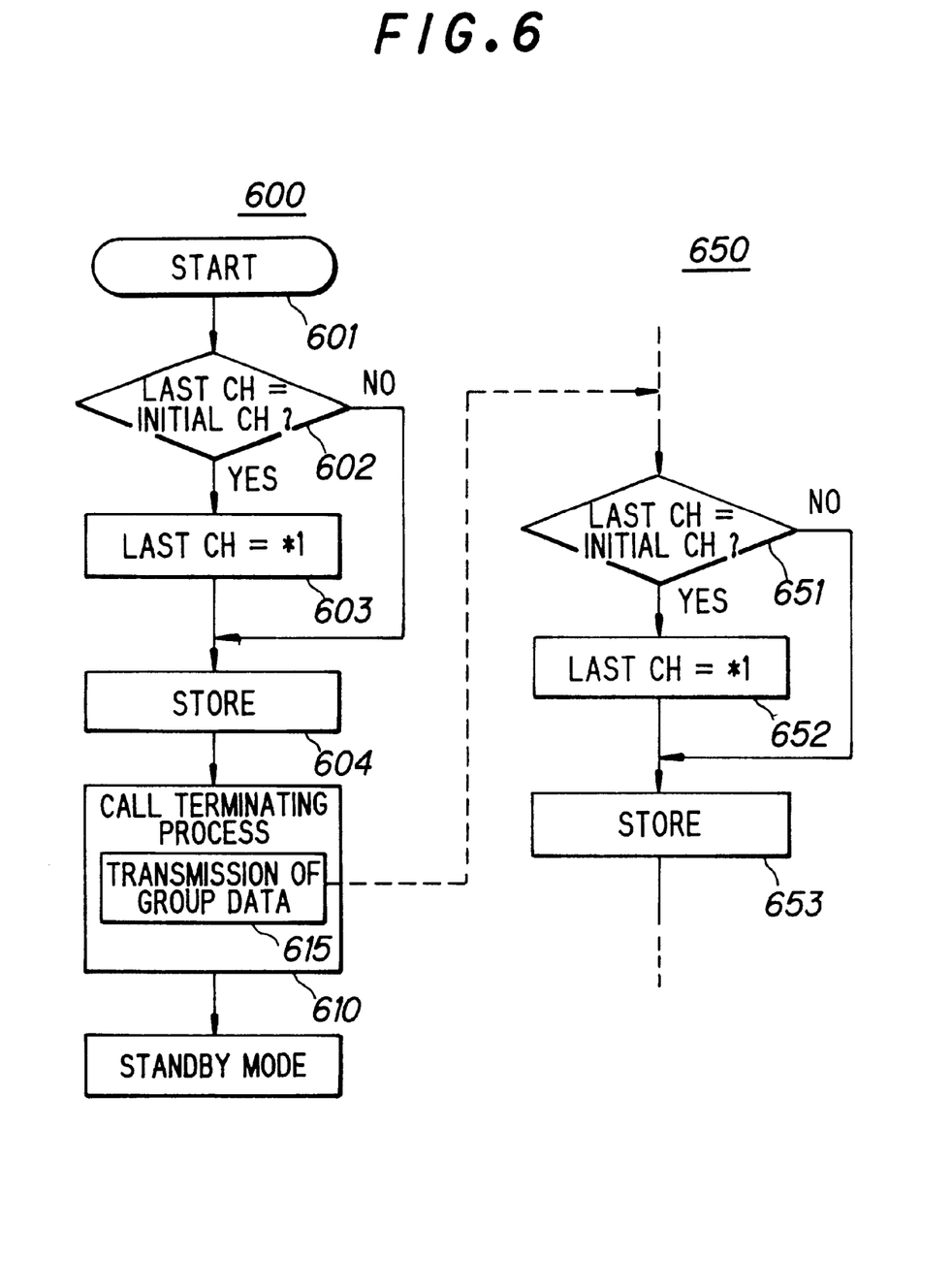
FIG. 6 is a flow chart showing an example of a process routine according to the present invention performed when a call is terminated.

When conversation is over (in a call mode), the call key among the operation keys 17 on the cordless handset 1 is pushed for making the CPU 161 execute the routine 600 starting from step 601. Next, it is checked at step 602 whether the channel which is currently used for the call is the initial channel.

If not, the process proceeds from step 602 to step 604 at which the channel number i of the currently used channel is stored in the RAM 163 as data ILAST indicating the last channel.

If it is determined at step 602 that the channel which is used for the current call is the initial channel, the process proceeds from step 602 to step 603. At step 603, the channel marked with *1 in FIG. 2A, for example, is regarded as the last channel and, at step 604, the channel number i of the channel regarded as the last channel is stored in the RAM 163 as the data ILAST indicating the last channel.

Thus, the currently used channel or the channel marked with *1 in FIG. 2A is stored as the last channel.

Subsequently, the process proceeds from step 604 to step 610 at which a call terminating process as in the prior art cordless handsets is performed. Specifically, data indicating the termination of a call is transmitted from the cordless handset 1 to the base unit 2, and the base unit 2 transmits data for a response thereto. Then, data indicating the beginning of the call terminating process is transmitted to the base unit 2 and, thereafter, the process enters the standby mode.

During the call terminating process at step 610, data GRPNUM indicating the group which is currently used by the cordless handset 1 on the table CHTBL is transmitted to the base unit 2 as a part of the data transmitted from the cordless handset 1 to the base unit 2. The purpose is to correct discrepancy between the groups used by the cordless handset 1 and base unit 2 which can occur, for example, when a channel belonging to both of the first and second groups such as the 16th channel is used.

At the base unit 2, a call terminating process similar to that in common base units is performed when data indicating the end of a call is transmitted from the cordless handset 1 during the call. Specifically, when the data indicating the end of a call is received from the cordless handset 1, data indicating the beginning of a call terminating process is returned and, thereafter, the process enters the standby mode.

The routing 650 is executed as a part of the call terminating process in progress. Specifically, at step 651 of the routine 650, it is checked whether the channel which has been used for the call is the initial channel. If yes, the process proceeds from step 651 to step 652 at which the channel marked with *1 in FIG. 2A, for example, is regarded as the last channel and, thereafter, the process proceeds to step 653.

If it is determined at step 651 that the channel which has been used for the call is not the initial channel, the process skips step 652 to proceed to step 653.

At step 653, the channel number i of the channel which has been regarded as the last channel is stored in the RAM 263 as the data ILAST indicating the last channel. Further, data GRPNUM indicating the group which has been transmitted from the cordless handset 1 is also stored in the RAM 263 at step 615.

As described above, when a call is terminated, the channel which has been used until then or the channel marked with *1 in FIG. 2A is stored at the cordless handset 1 and base unit 2 along with the group which has been used by the cordless handset 1. Therefore, the groups and the last channels stored in the cordless handset 1 and base unit 2 agree with each other.

In the above-described cordless telephone, 25 communication channels are divided into two groups each consisting of 15 channels, and the base unit 2 needs only to monitor the 15 channels belonging to one of the groups sequentially in the standby mode. This shortens the time required for making a round of the channels to be monitored, which makes it possible to shorten the time interval between a push on the call key and the acceptance of inputs on the dial keys when a call is placed.

In doing so, if there are 15 channels, the variable i for specifying a channel can be represented by four bits. That is, a loop variable i for channel switching can be represented by four bits. This, even if the CPU 261 is for merely 4 bit processing, makes the processing simple with shortened processing time. Hence, the time required for channel switching itself can be shortened to reduce the time required for channel switching itself, which leads to a reduction in the time required for making a round of the channels to be monitored.

Since only two channels are monitored out of the 25 channels when the cordless handset 1 is in the standby mode, it is possible to expand the period of the sleep mode. This allows the consumption of a battery to be suppressed.

Since some of 25 channels which are divided into two groups are allowed to belong to both groups, the cordless handset 1 and base unit 2 can exchange information with each other through such channels belonging to both groups even if the cordless handset 1 and base unit 2 use different groups for some reason. This makes it possible to avoid a problem of impossibility of connection between the cordless handset 1 and base unit 2 due to their using different groups.

In addition, when crosstalk occurs during a call, a push on the channel switch key allows the group which has been used until then to be switched to the other. As a result, the 25 channels can be equally used even though the 25 channels are grouped.

While low cost cordless telephones always use the same fixed channel in general, in the cordless telephone described above, one of the channels which is monitored by the cordless handset 1 in the standby mode is made to be the last channel, i.e., the standby mode is enabled with the channel used for the previous call. Therefore, if there is a cordless telephone having a fixed channel in the vicinity thereof, such a channel shall not be selected as the last channel. This makes it possible to connect the cordless handset 1 and base unit 2 quickly in receiving a call with improved utilization of channels.

The channels belonging to both of the two groups include half of the currently available 10 channels. Therefore, cordless telephones employing the present invention can be used with cordless telephones without employing the present invention.

In the above description, when the channel switch key is pushed, the group is switched and the variable i indicating the channel number is incremented by two at steps 504 and 553. Alternatively, the variable i may be incremented by one; the incremented variable i may be converted into a predetermined value using a conversion table, and the channel (channel number) may be incremented by one by referring to the channel table CHTBL using the converted variable i.

An alternative arrangement may be employed wherein a push on the channel switch key causes the group and the channel to be changed so that an unoccupied channel is searched in the group assigned after the change if the channel assigned after the change is in use, and the cordless handset 1 and base unit 2 is connected by using thus found unoccupied channel.

In addition, if the channel used at the cordless handset 1 or base unit 2 is decided to be unsuitable for use due to crosstalk or the like, it is possible to automatically perform a channel switching process similar to that enabled by the operation on the channel switch key. When an extension call is carried out between the cordless handset 1 and base unit 2, the connection between the cordless handset 1 and base unit 2 may be established in the same way as for the above-described calling and call reception.

According to the present invention, communication channels are divided into two groups, and the base unit 2 needs to monitor only the channels belonging to one of the groups sequentially. It is therefore possible to shorten the time required for making a round of the channels to be monitored. This makes it possible to shorten the time interval between a push on the call key and the acceptance of inputs on the dial keys when a call is placed.

In this case, if one group includes 16 channels or less, the variable i for specifying a channel can be represented by four bits. That is, the loop variable i for channel switching can be constituted by four bits. Thus, the process can be simple even if the CPU 261 performs processing on a four-bit basis, which leads to a reduction in processing time. As a result, the time required for channel switching itself can be reduced, which also helps the reduction of the time required for making a round of the channels to be monitored.

Since only two of the multiplicity of channels are monitored when the cordless handset 1 is in the standby mode, it is possible to expand the period of the sleep mode. This allows the consumption of a battery to be suppressed.

Since some of the channels which are divided into two groups are allowed to belong to both groups, the cordless handset 1 and base unit 2 can exchange information with each other through such channels belonging to both groups even if the cordless handset 1 and base unit 2 use different groups for some reason. This makes it possible to avoid a problem of impossibility of connection between the cordless handset 1 and base unit 2 due to their using different groups.

In addition, when crosstalk occurs during a call, a push on the channel switch key allows the group which has been used until then to be switched to another. As a result, the number of channels can be equally used even though the number of channels are grouped.

While low cost cordless telephones always use the same fixed channel in general, in the cordless telephone described above, one of the channels which is monitored by the cordless handset 1 in the standby mode is made to be the last channel, i.e., the standby mode is enabled with the channel used for the previous call. Therefore, if there is a cordless telephone having a fixed channel in the vicinity thereof, such a channel shall not be selected as the last channel. This makes it possible to connect the cordless handset 1 and base unit 2 quickly in receiving a call with improved utilization of channels.

The channels belonging to both of the two groups include half of the currently available 10 channels. Therefore, cordless telephones employing the present invention can be used with cordless telephones without employing the present invention.

While the invention has been described with reference to a specific embodiment, it will be apparent to those skilled in the art that improvements and modifications may be made without departing from the scope of the invention defined in the appended claims.

What is claimed is:

1. A cordless telephone wherein a cordless handset and a base unit are connected using any one of a plurality of communication channels to allow a call, comprising:

means for dividing said plurality of communication channels into a plurality of unnested groups, wherein each unnested group shares a common subset of channels and shares channels different than said common subset of channels;

means for selecting a selected group from said plurality of unnested groups;

means for effecting modes of operation including standby, calling, and call receiving modes of operation using a communication channel included in said selected group, wherein when in said standby mode said handset monitors one of said common subset of channels and said base unit monitors said selected group only; and means for determining whether a last channel employed during said call mode is not being used by another unit and for using said last channel so determined upon initiation of a subsequent call mode.

2. The cordless telephone according to claim 1, wherein said cordless handset comprises means for identifying a first communication channel of said plurality of communication channels used for a most recent call, and means for effecting said standby mode of operation by using a second communication channel of said common subset of channels shared by said plurality of groups and said first communication channel used for the most recent call.

3. The cordless telephone according to claim 2, wherein said cordless handset further comprises means for effecting a sleep mode of operation wherein power supplies of said cordless handset are turned off for a predetermined period of time, and means for alternately effecting monitoring of said second communication channel and said first communication channel and said sleep mode of operation in said standby mode.

4. The cordless telephone according to claim 3, further comprising means for switching said communication channel from said selected group used for said call to another communication channel belonging to another group of said plurality of unnested groups in response to an operation on a predetermined key of said cordless handset.

5. A method of connecting a cordless handset and a base unit of a cordless telephone system using any one of a plurality of communication channels to allow a call, comprising the steps of:

dividing said plurality of communication channels into a plurality of unnested groups, wherein each unnested group shares a common subset of channels and shares channels different than said common subset of channels;

selecting a selected group from said plurality of unnested groups;

effecting modes of operation including standby, calling and call receiving modes of operation using a communication channel included in said selected group, wherein when in said standby mode said handset monitors one of said common subset of channels and said base unit monitors said selected group only; and determining whether a last channel employed during said call mode is not being used by another unit and for using said last channel so determined upon initiation of a subsequent call mode.

6. The method according to claim 5, wherein said cordless handset comprises means for identifying a first communication channel of said plurality of communication channels used for a most recent call, and for effecting said standby mode of operation by using a second communication channel of said common subset of channels shared by said plurality of groups and said first communication channel used for the most recent call.

7. The method according to claim 6, wherein said cordless handset further comprises means for effecting a sleep mode of operation wherein power supplies of said cordless handset are turned off for a predetermined period of time, and alternately effects monitoring of said second communication channel and said first communication channel and said sleep mode of operation in said standby mode.

8. The method according to claim 5, wherein said communication channel from said selected group used for said call is switched to another communication channel belonging to another group of said plurality of unnested groups in response to an operation on a predetermined key of said cordless handset.

* * * * *